United States Patent
Walter et al.

(10) Patent No.: US 12,392,411 B2
(45) Date of Patent: Aug. 19, 2025

(54) SEAL ARRANGEMENT WITH LOW DRAG SEAL GLAND

(71) Applicant: Schaeffler Technologies AG & Co. KG, Herzogenaurach (DE)

(72) Inventors: Tyler Walter, Ashland, OH (US); David Avins, Burbank, OH (US); Victor Norwich, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 77 days.

(21) Appl. No.: 17/726,979

(22) Filed: Apr. 22, 2022

(65) Prior Publication Data

US 2023/0341055 A1 Oct. 26, 2023

(51) Int. Cl.
*F16J 15/3268* (2016.01)
*F16J 15/16* (2006.01)

(52) U.S. Cl.
CPC ......... *F16J 15/3268* (2013.01); *F16J 15/166* (2013.01)

(58) Field of Classification Search
CPC ...... F16J 15/3268; F16J 15/166; F16J 15/021; F16J 15/06; F16J 15/061; F16J 15/062; F16J 15/064
See application file for complete search history.

(56) References Cited

U.S. PATENT DOCUMENTS

| | | | |
|---|---|---|---|
| 2,462,596 A | 2/1949 | Bent | |
| 2,553,222 A * | 5/1951 | Wallgren | F16J 15/0881 285/918 |
| 2,690,360 A | 9/1954 | Young | |
| 3,214,182 A * | 10/1965 | Herbruggen | F16J 15/32 277/465 |
| 4,165,882 A * | 8/1979 | Crow | F16J 15/32 405/104 |
| 4,298,204 A * | 11/1981 | Jinkins | F16J 15/062 277/910 |
| 4,544,049 A | 10/1985 | Shellhause | |
| 4,732,550 A * | 3/1988 | Suzuki | F01C 1/0215 418/57 |
| 5,482,297 A | 1/1996 | Burns et al. | |
| 6,361,052 B1 * | 3/2002 | Farinella | F16L 17/06 277/626 |
| 8,269,104 B2 * | 9/2012 | Choraku | H05K 5/061 277/630 |
| 8,388,232 B2 * | 3/2013 | Lida | F16C 27/066 277/641 |

(Continued)

FOREIGN PATENT DOCUMENTS

EP 1113200 A2 * 7/2001 ............. F16J 15/062
WO 9424466 10/1994

*Primary Examiner* — Christine M Mills
*Assistant Examiner* — L. Susmitha Koneru
(74) *Attorney, Agent, or Firm* — Volpe Koenig

(57) ABSTRACT

A seal arrangement is provided having a first part with a seal gland, and a seal located in the seal gland. The seal has an outer sealing surface and an inner support surface that is supported on a bottom support surface of the seal gland. A second part having a sealing surface is provided against which the outer sealing surface of the seal is pressed. A relief area is formed in a portion of the bottom support surface of the seal gland, with the relief area being configured to receive a resiliently deflected portion of the inner support surface of the seal during assembly. A method of assembling a sealing arrangement is also provided.

17 Claims, 2 Drawing Sheets

(56) References Cited

U.S. PATENT DOCUMENTS

| | | | | |
|---|---|---|---|---|
| 9,167,876 B2* | 10/2015 | Yamaguchi | ............ | H05K 5/061 |
| 9,844,157 B1* | 12/2017 | Spencer | ................ | G06F 1/1656 |
| 10,066,881 B2* | 9/2018 | Hruza | ................... | F28F 9/0226 |
| 10,415,728 B2* | 9/2019 | Raper | ................... | F16L 21/035 |
| 2007/0175172 A1* | 8/2007 | Sousa | .................... | F16J 15/062 |
| | | | | 52/741.1 |

* cited by examiner

SEAL ARRANGEMENT WITH LOW DRAG SEAL GLAND

TECHNICAL FIELD

The disclosure relates to a seal arrangement between two parts, and more particularly to a seal gland to reduce drag and or damage to the seal during assembly.

BACKGROUND

Conventional seal devices or radial seals form a seal between inner and outer lateral surfaces. The seal prevents material on one side of the seal from entering an opposite of the area being sealed. This can be, for example, to maintain lubricating or hydraulic fluid on one side of a seal, or to prevent the ingress of dirt and debris.

During assembly of the parts carrying the surfaces being sealed, the seal body is resiliently compressed into a seal gland, for example formed as a groove, that retains the seal in position on one of the parts. The compression provides an elastic sealing force to press the seal against the walls of the seal gland and the opposing surface contacted by the seal. The amount of seal compression varies depending on a number of factors, including the seal size and material, clearance of the seal in a nominal position in the gland, the gland size, the clearance between the surfaces being sealed, and the desired force being applied by the seal against the surfaces, among others. Depending on the assembly and the size of the seal and the gland, it is possible for the seal to roll during installation, which can result in seal leakage under pressurization, particularly with seals having a shaped cross-section—such as a D-seal.

It would be desirable to provide a seal arrangement that reduced the possibility of assembly defects that can reliably provide the desired sealing properties.

SUMMARY

In one aspect, a seal arrangement is provided having a first part with a seal gland, and a seal located in the seal gland. The seal has an outer sealing surface and an inner support surface that is supported on a bottom support surface of the seal gland. A second part having a sealing surface is provided against which the outer sealing surface of the seal is pressed. A relief area is formed in a portion of the bottom support surface of the seal gland, with the relief area being configured to receive a resiliently deflected portion of the inner support surface of the seal during assembly.

The seal gland is configured to reduce compression and the overall force required during installation of the seal. This is accomplished by bottom surface of the seal gland being provided with an extra expansion volume formed by the relief area during installation while still maintaining the seal gland properties for compression and gap from the seal gland to the sealing surface.

In one embodiment, the first and second parts are generally circular or cylindrical, at least in an area of the seal arrangement, and the seal is ring-shaped.

In the exemplary embodiment, the relief area is formed in a medial area of bottom support surface of the seal gland. Here, the inner support surface of the seal extends on both sides of the relief area on the bottom support surface.

In the exemplary embodiment, the relief area that is configured to receive the resiliently deflected portion of the inner support surface of the seal during assembly has a parabolic form in cross-section. This reduces stress concentration points on the seal as it resiliently deflects into the relief area during assembly.

In one embodiment, the second part includes a lead-in area configured to compress the seal during assembly of the first and second parts.

The relief area can be formed as a machined cut in the bottom support surface. Alternatively, it can be formed by other means.

In one embodiment, the relief area has a volume that is less than about 15% of a volume of the seal, and more preferably less than about 10%.

In another aspect, a method of forming a seal arrangement is disclosed. The method includes: (a) providing a first part having a seal gland; (b) forming a relief area in a portion of a bottom support surface of the seal gland; (c) installing a seal in the seal gland, the seal having an outer sealing surface and an inner support surface that is supported on the bottom support surface of the seal gland; (d) installing a second part having a sealing surface against the outer sealing sur-face of the seal by sliding the first and second parts together relative to one another; and (e) compressing the seal during the installing step such that a resiliently deflected portion of the inner support surface of the seal expands into the relief area during assembly.

In one aspect, the relief area is formed in a medial area of bottom support surface of the seal gland. Here, the inner support surface of the seal can extend on both sides of the relief area on the bottom support surface.

In one aspect, the relief area has a parabolic form in cross-section. This reduces stress concentration points on the seal as it resiliently deflects into the relief area during assembly.

In one aspect, the second part includes a lead-in area, and the method further includes the lead-in area compressing the seal during assembly of the first and second parts.

The method may also comprise machining the relief area in the bottom support surface. However, the relief area can be formed by other means.

In one aspect, the relief area may have a volume that is less than about 15% of a volume of the seal, and more preferably less than about 10%.

Various features of the invention can be used alone or in combination in order to achieve one or more of the benefits described herein.

BRIEF DESCRIPTION OF THE DRAWINGS

The foregoing Summary and the following detailed description will be better understood when read in conjunction with the appended drawings, which illustrate preferred embodiments according to the disclosure. In the drawings.

DETAILED DESCRIPTION

Figure 1:
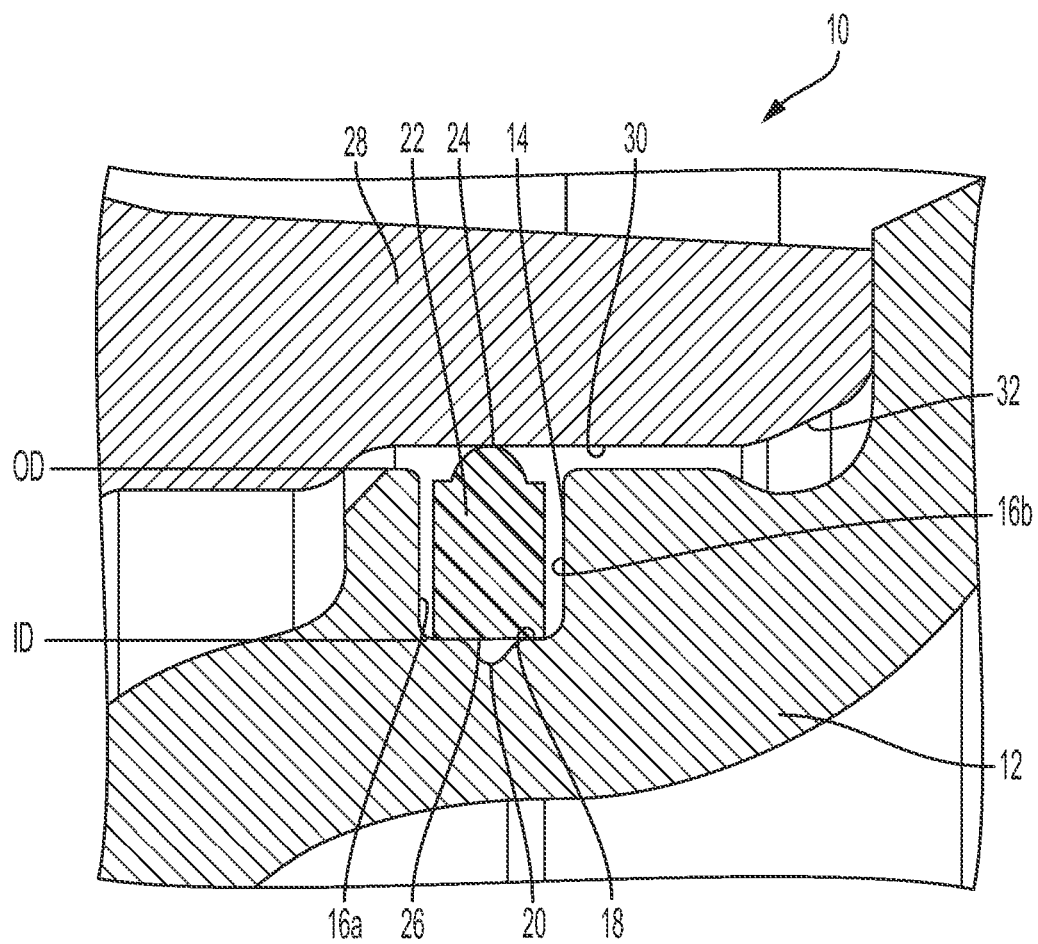
FIG. 1 is a cross-section through a seal arrangement according to one exemplary embodiment.

Certain terminology is used in the following description for convenience only and is not limiting. The words "inwardly" and "outwardly" refer to directions toward and away from the parts referenced in the drawings. "Axially" refers to a direction along the axis of a shaft. "Radially" refers to a direction normal to an axis. A reference to a list of items that are cited as, for example, "at least one of a or b" (where a and b represent the items being listed) means any single one of the items a or b, or a combination of a and b thereof. This would also apply to lists of three or more items in like manner so that individual ones of the items or combinations thereof are included. The terms "about" and "approximately" encompass + or −10% of an indicated value unless otherwise noted. The terminology includes the words specifically noted above, derivatives thereof and words of similar import.

Referring now to FIG. 1, an exemplary embodiment of a seal arrangement 10 is shown. The seal arrangement 10 includes a first part 12 having a seal gland 14, which can be formed as a circumferentially extending groove. The seal gland 14 has side walls 16a, 16b as well as a bottom support surface 18. A seal 22 is located in the seal gland 14, and the seal 22 has an outer surface 24 and an inner support surface 26 that is supported on the bottom support surface 18 of the seal gland 14. A second part 28 having a sealing surface 30 is provided against which the outer sealing surface 24 of the seal 22 is pressed. In the exemplary embodiment, the first and second parts 12, 28 are generally circular or cylindrical at least in an area of the seal arrangement 10, and the seal 22 is ring-shaped. In the exemplary embodiment, the seal 22 has a D-shape in cross-section, and can be a D-ring seal. The body of the seal 22 except for the extending D-shape that forms the outer sealing surface 24 is preferably located between the outside diameter OD at the surface of the first part and the inside diameter ID of the seal gland 14.

In order to reduce the chance of the seal 22 rolling during assembly, a relief area 20 is formed in a portion of the bottom support surface 18 of the seal gland 14. The relief area 20 is configured to receive a resiliently deflected portion of the inner support surface 26 of the seal 22 during assembly. By providing the relief area 20 that is configured to receive a resiliently deflected portion of the inner support surface 26 of the seal 22 during assembly, the overall compression and force required to install the first and second parts 12, 28 together with the seal 22 is reduced and rolling of the seal 22 during assembly is avoided. This is due to the relief area 20 providing extra expansion volume in which the seal 22 is compressed or deflects which is important during installation, but still allows the seal glad properties for compression and gap from the seal gland 14 to the sealing surface 30 of the second part 28 to be maintained.

As shown in FIG. 1, the relief area 20 can be formed in a medial area of the bottom support surface 18 of the seal gland 14. This allows the inner support surface 26 of the seal 22 to extend on both sides of the relief area 20 on the bottom support surface 18, providing support for the seal in order to maintain the sealing properties of the outer sealing surface 24 against the sealing surface 30 of the second part 28.

The relief area 20 that is configured to receive the resiliently deflected portion of the inner support surface 26 of the seal 22 during assembly can have a parabolic form in cross-section. This form allows for easier resilient deflection of the seal 22 into the relief area 20 without stress concentration points forming on the seal 22 that could result in plastic deformation of the seal 22. This is important for maintaining the sealing function of the seal 22 in the seal arrangement 10.

As shown in FIG. 1, the second part 28 may include a lead-in area 32 configured to compress the seal 22 during assembly of the first and second parts 12, 28.

In one embodiment, the relief area 20 is formed as a machine cut in a bottom of the support surface 18. However, it could be formed by other methods.

While the specific compression of the seal and the size of the seal gland 14 are case specific, in the exemplary embodiment the relief area 20 has a volume that is less than about 15% of a volume of the seal 12, and more preferably less than about 10%.

Figure 2:
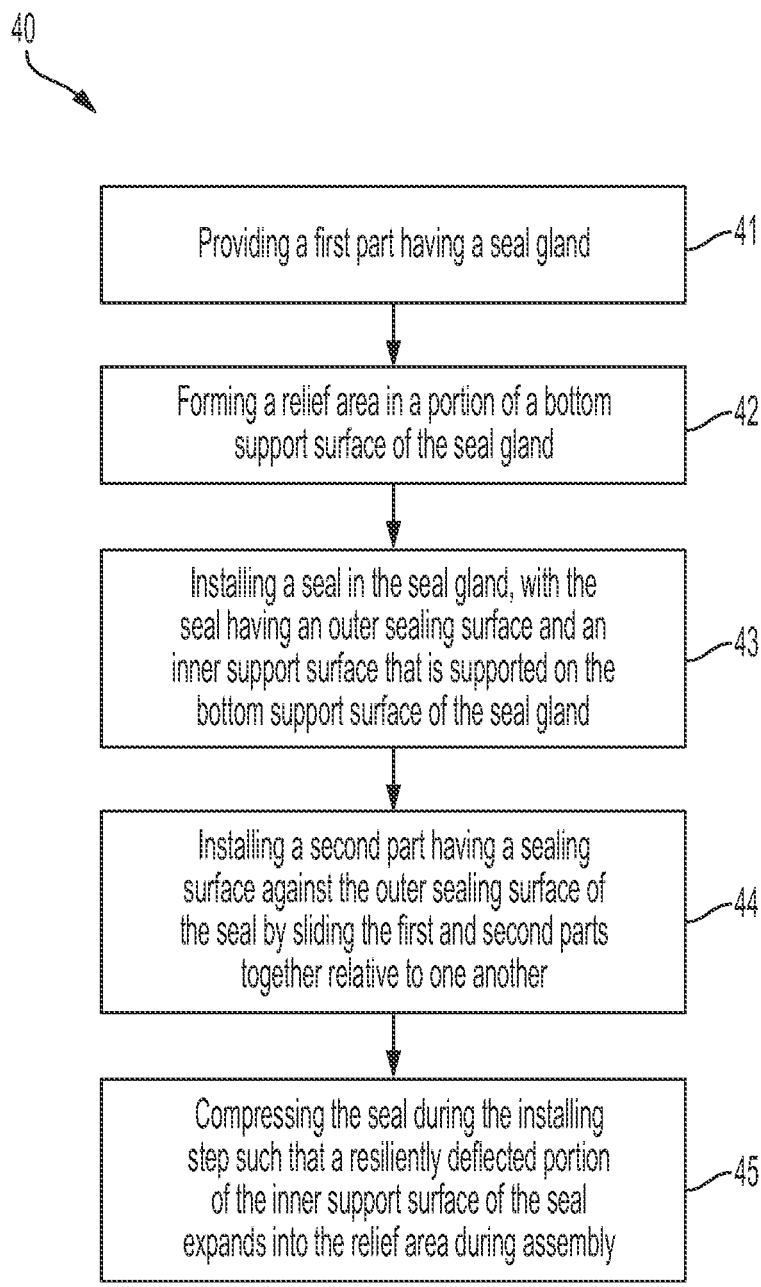
FIG. 2 is a flow chart illustrating a method of forming a seal arrangement.

Referring to FIG. 2, a method of forming a seal arrangement 10 is indicated as 40. As shown in FIG. 2, the method includes providing a first part 12 having a seal gland 14, as indicated at 41. The method further includes forming a relief area 20 in a portion of a bottom support surface 18 of the seal gland 14, as indicated at 42. The method further includes installing a seal 22 in the seal gland 14, with the seal 22 having an outer sealing surface 24 and an inner support surface 26 that is supported on the bottom support surface 18 of the seal gland 14, as noted at 43. The method further includes installing a second part 28 having a sealing surface 30 against the outer sealing surface 24 of the seal 22 by sliding the first and second parts 12, 28 together relative to one another, as indicated at 44. Further, the method includes compressing the seal 22 during the installing steps such that a resiliently deflected portion of the inner support surface 26 of the seal 22 expands into the relief area 20 during assembly, as indicated at 45.

As discussed above, the relief area 20 is preferably formed in a medial area of the bottom support surface 18 of the seal gland 14. The method preferably includes the inner support surface 26 of the seal 22 extending on both sides of the relief area 20 on the bottom support surface 18 of the seal gland 14.

As discussed above, preferably the relief area 20 has a parabolic form in cross-section.

Further, the method further includes providing the second part 28 with a lead-in area 32 and the method further includes the lead-in area 32 compressing the seal 22 during assembly of the first and second parts 12, 28.

The method may further include machining the relief area 20 in the bottom support surface 18 of the seal gland 14. However, the relief area can be formed by other means.

Additionally, the method can further include providing the relief area 20 with a volume that is less than about 15% of a volume of the seal 22, and more preferably less than about 10%. However, the specific size of the relief area 20 relative to the volume of the seal 22 can vary depending upon the particular application and the overall size of the seal gland.

Having thus described the presently preferred embodiments in detail, it is to be appreciated and will be apparent to those skilled in the art that many physical changes, only a few of which are exemplified in the detailed description, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope that is indicated by the appended claims rather than by the foregoing description, and all alternate embodiments and changes to this embodiment which come within the meaning and range of equivalency of said claims are therefore to be embraced therein.

LIST OF REFERENCE SYMBOLS 10 seal arrangement
12 first part
14 seal gland
16a,b side walls 18 bottom support surface
20 relief area
22 seal
24 outer surface
26 inner support surface
28 second part
30 sealing surface
32 lead-in area
40 method
41-45 method steps
OD outside diameter
ID inside diameter

The invention claimed is:

1. A seal arrangement, comprising: a first part having a seal gland including a first side surface, a second side surface, and a bottom support surface; a seal located in the seal gland between the first side surface and the second side surface, the seal having an outer sealing surface and an inner support surface that is supported on the bottom support surface of the seal gland, the inner support surface being flat from a first lateral side to a second lateral side of the seal; a second part having a sealing surface against which the outer sealing surface of the seal is pressed; wherein the second part includes a lead-in area configured to compress the seal during assembly of the first and second parts; and a relief area formed in a portion of the bottom support surface of the seal gland, the relief area being configured to receive a resiliently deflected portion of the inner support surface of the seal during assembly, wherein the relief area has a parabolic form in cross-section; wherein the first side surface of the seal gland is positioned adjacent and non-contacting a first side of the seal, the second side surface of the seal gland is positioned adjacent and non-contacting a second side of the seal, and the bottom support surface of the seal gland is positioned adjacent and contacting the inner support surface of the seal.

2. The seal arrangement of claim 1, wherein the relief area is formed in a medial area of the bottom support surface of the seal gland.

3. The seal arrangement of claim 1, wherein the inner support surface of the seal extends on both sides of the relief area on the bottom support surface.

4. The seal arrangement of claim 1, wherein the second part includes a lead-in area configured to compress the seal during assembly of the first and second parts.

5. The seal arrangement of claim 1, wherein the relief area is formed as a machined cut in the bottom support surface.

6. The seal arrangement of claim 1, wherein the relief area has a volume that is less than about 15% of a volume of the seal.

7. A method of forming a seal arrangement, the method comprising: providing a first part having a seal gland; forming a relief area in a portion of a bottom support surface of the seal gland; installing a seal in the seal gland, the seal having an outer sealing surface and an inner support surface that is supported on the bottom support surface of the seal gland; installing a second part having a sealing surface against the outer sealing surface of the seal by sliding the first and second parts together relative to one another; and compressing the seal during the installing step such that a resiliently deflected portion of the inner support surface of the seal expands into the relief area during assembly; wherein the second part includes a lead-in-area that compresses the seal during the installing and compressing steps, the lead-in-area is free from contact with the seal after installing the second part on the first part, and the lead-in-area is orientated at a non-perpendicular and non-parallel angle with respect to the sealing surface of the second part; wherein a first side surface of the seal gland is positioned adjacent and non-contacting a first side of the seal, a second side surface of the seal gland is positioned adjacent and non-contacting a second side of the seal, and the bottom support surface of the seal gland is positioned adjacent and contacting the inner support surface of the seal.

8. The method of claim 7, wherein the relief area is formed in a medial area of the bottom support surface of the seal gland.

9. The method of claim 7, wherein the inner support surface of the seal extends on both sides of the relief area on the bottom support surface.

10. The method of claim 7, wherein the relief area has a parabolic form in cross-section.

11. The method of claim 7, further comprising machining the relief area in the bottom support surface.

12. The method of claim 7, wherein the relief area has a volume that is less than about 15% of a volume of the seal.

13. The method of claim 7, wherein the lead-in-area is axially offset from the seal gland after the second part is installed on the first part.

14. The seal arrangement of claim 1, wherein the seal is a D-ring seal.

15. The method of claim 7, wherein the seal is a D-ring seal.

16. The seal arrangement of claim 1, wherein the inner support surface of the seal is located radially between an outside diameter and an inside diameter of the seal gland, and the outer sealing surface is located radially outside the outside diameter of the seal gland.

17. A seal arrangement comprising: a first part having a seal gland including a first side surface, a second side surface, and a bottom support surface; a seal located in the seal gland between the first side surface and the second side surface, the seal having an outer sealing surface and an inner support surface that is supported on the bottom support surface of the seal gland, the inner support surface being flat from a first lateral side to a second lateral side of the seal; a second part having a sealing surface against which the outer sealing surface of the seal is pressed; and a relief area formed in a portion of the bottom support surface of the seal gland, the relief area being configured to receive a resiliently deflected portion of the inner support surface of the seal during assembly; wherein the first side surface of the seal gland is positioned adjacent and non-contacting a first side of the seal, the second side surface of the seal gland is positioned adjacent and non-contacting a second side of the seal, and the bottom support surface of the seal gland is positioned adjacent and contacting the inner support surface of the seal.

* * * * *